(12) United States Patent
Morrison et al.

(10) Patent No.: US 9,672,006 B2
(45) Date of Patent: Jun. 6, 2017

(54) FRAMEWORKS, DEVICES AND METHODS CONFIGURED FOR ENABLING A MULTI-MODAL USER INTERFACE CONFIGURED TO DISPLAY FACILITY INFORMATION

(71) Applicant: Honeywell International Inc., Morristown, NJ (US)

(72) Inventors: John D. Morrison, Mt. Colah (AU); Peter C. Davis, Killara (AU); Graeme Laycock, Hunters Hill (AU)

(73) Assignee: Honeywell International Inc., Morris Plains, NJ (US)

( * ) Notice: Subject to any disclaimer, the term of this patent is extended or adjusted under 35 U.S.C. 154(b) by 274 days.

(21) Appl. No.: 14/300,103

(22) Filed: Jun. 9, 2014

(65) Prior Publication Data

US 2014/0365896 A1   Dec. 11, 2014

(30) Foreign Application Priority Data

Jun. 10, 2013 (AU) ................... 2013902086
Jun. 25, 2013 (AU) ................... 2013902312

(51) Int. Cl.
  *G06F 3/16* (2006.01)
  *G06F 3/0488* (2013.01)
  *G06F 3/0485* (2013.01)
  *G05B 15/02* (2006.01)

(52) U.S. Cl.
  CPC ............ *G06F 3/167* (2013.01); *G05B 15/02* (2013.01); *G06F 3/0485* (2013.01); *G06F 3/0488* (2013.01)

(58) Field of Classification Search
  CPC .................. G06F 3/0488; G06F 3/0486
  See application file for complete search history.

(56) References Cited

U.S. PATENT DOCUMENTS

| | | | |
|---|---|---|---|
| 6,167,316 A | 12/2000 | Gloudeman et al. | |
| 6,965,376 B2 | 11/2005 | Tani et al. | |
| 7,567,844 B2 | 7/2009 | Thomas et al. | |
| 7,587,274 B2 | 9/2009 | Kaldewey et al. | |
| 7,861,180 B2 | 12/2010 | Liu et al. | |

(Continued)

FOREIGN PATENT DOCUMENTS

| | | |
|---|---|---|
| CN | 103793042 | 5/2014 |
| DE | 202012002010 | 7/2012 |
| FR | 3001098 | 7/2014 |

OTHER PUBLICATIONS

International Search Report Cited in PCT Application Serial No. PCT/IB2014/061964, completed Sep. 22, 2014.

(Continued)

*Primary Examiner* — David Choi
(74) *Attorney, Agent, or Firm* — Seager, Tufte & Wickhem, LLP

(57) ABSTRACT

Described herein are frameworks, devices and methods configured for enabling display for facility information and content, in some cases via touch/gesture controlled interfaces. Embodiments of the invention have been particularly developed for allowing an operator to conveniently access a wide range of information relating to a facility via, for example, one or more wall mounted displays. While some embodiments will be described herein with particular reference to that application, it will be appreciated that the invention is not limited to such a field of use, and is applicable in broader contexts.

12 Claims, 10 Drawing Sheets

(56) References Cited

U.S. PATENT DOCUMENTS

| | | | |
|---|---|---|---|
| 7,895,599 | B2 | 2/2011 | Muscarella |
| 7,899,777 | B2 | 3/2011 | Baier et al. |
| 7,900,215 | B2 | 3/2011 | Engber et al. |
| 7,904,209 | B2 | 3/2011 | Podgorny et al. |
| 7,908,560 | B2 | 3/2011 | Balfe et al. |
| 7,954,070 | B2 | 5/2011 | Plocher et al. |
| 7,971,151 | B2 | 6/2011 | Nixon et al. |
| 8,036,872 | B2 | 10/2011 | Nasle et al. |
| 8,233,008 | B2 | 7/2012 | Jin et al. |
| 8,269,729 | B2 | 9/2012 | Han et al. |
| 8,270,767 | B2 | 9/2012 | Park |
| 8,302,029 | B2 | 10/2012 | Makela |
| 8,352,176 | B2 | 1/2013 | Kaldewey et al. |
| 8,434,029 | B2 | 4/2013 | Albright |
| 8,464,181 | B1 | 6/2013 | Baillang et al. |
| 8,490,025 | B2 | 7/2013 | Jakobson et al. |
| 8,532,962 | B2 | 9/2013 | Zhang et al. |
| 8,584,030 | B2 | 11/2013 | Laycock et al. |
| 8,615,396 | B2 | 12/2013 | Grigsby et al. |
| 8,681,153 | B2 | 3/2014 | Houllier et al. |
| 8,712,192 | B2 | 4/2014 | Thota |
| 8,775,068 | B2 | 7/2014 | Pylappan |
| 8,791,912 | B2 | 7/2014 | Chen et al. |
| 8,918,413 | B2 | 12/2014 | Hiestermann et al. |
| 8,928,657 | B2 | 1/2015 | Bailiang |
| 2003/0078677 | A1 | 4/2003 | Hull et al. |
| 2004/0254963 | A1 | 12/2004 | Bradley et al. |
| 2007/0101383 | A1 | 5/2007 | MacIntosh et al. |
| 2011/0087988 | A1 | 4/2011 | Ray et al. |
| 2012/0072052 | A1 | 3/2012 | Powers et al. |
| 2012/0158185 | A1 | 6/2012 | El-Mankabady et al. |
| 2013/0041486 | A1 | 2/2013 | Lee et al. |
| 2013/0083035 | A1 | 4/2013 | Han et al. |
| 2013/0083055 | A1 | 4/2013 | Pemonte et al. |
| 2013/0205257 | A1 | 8/2013 | Albright |
| 2013/0321401 | A1 | 12/2013 | Piemonte et al. |
| 2014/0013263 | A1 | 1/2014 | Bailiang et al. |
| 2014/0137017 | A1 | 5/2014 | Sharma et al. |
| 2014/0152698 | A1 | 6/2014 | Kim et al. |
| 2014/0223360 | A1 | 8/2014 | Bailiang |
| 2014/0245232 | A1 | 8/2014 | Bailiang |
| 2014/0253538 | A1 | 9/2014 | Bailiang et al. |
| 2014/0362112 | A1 | 12/2014 | Morrison et al. |
| 2014/0365891 | A1 | 12/2014 | Morrison et al. |
| 2014/0365942 | A1 | 12/2014 | Morrison et al. |
| 2014/0365976 | A1 | 12/2014 | Morrison et al. |
| 2014/0365980 | A1 | 12/2014 | Morrison et al. |

OTHER PUBLICATIONS

Written Opinion of the International Searching Authority Cited in PCT Application Serial No. PCT/IB2014/061964, completed Sep. 22, 2014.

FRAMEWORKS, DEVICES AND METHODS CONFIGURED FOR ENABLING A MULTI-MODAL USER INTERFACE CONFIGURED TO DISPLAY FACILITY INFORMATION

The present application claims priority to Australian Patent Application No. 2013902086, filed on Jun. 10, 2013, entitled "FRAMEWORKS, DEVICES AND METHODS CONFIGURED FOR ENABLING TOUCH/GESTURE CONTROLLED DISPLAY FOR FACILITY INFORMATION AND CONTENT", which is incorporated herein by reference. The present application also claims priority to Australian Patent Application No. 2013902312, filed on Jun. 25, 2013, entitled "FRAMEWORKS, DEVICES AND METHODS CONFIGURED FOR ENABLING A MULTI-MODAL USER INTERFACE CONFIGURED TO DISPLAY FACILITY INFORMATION", which is also incorporated herein by reference.

FIELD OF THE INVENTION

The present invention relates to frameworks, devices and methods configured for enabling touch/gesture controlled display for facility information and content. Embodiments of the invention have been particularly developed for allowing an operator to conveniently access a wide range of information relating to a facility via, for example, a wall mounted glass-type display. While some embodiments will be described herein with particular reference to that application, it will be appreciated that the invention is not limited to such a field of use, and is applicable in broader contexts.

BACKGROUND

Any discussion of the background art throughout the specification should in no way be considered as an admission that such art is widely known or forms part of common general knowledge in the field.

There are a wide range of information systems configured to provide access to information regarding facility information, for example building systems such as HVAC, access control, surveillance, and so on. These information systems tend to rely on tree-structures for navigation, and are optimised for use via a traditional PC-style interface (i.e. keyboard and mouse).

SUMMARY OF THE INVENTION

It is an object of the present invention to overcome or ameliorate at least one of the disadvantages of the prior art, or to provide a useful alternative.

One embodiment provides a computer implemented method for displaying building information to a user via a touch/gesture driven user interface that is rendered on a display screen, the method including:

(i) based on current navigation data, displaying a portion of a map layer, wherein the map layer includes image data representative of a facility; and (ii) positioning, on the displayed portion of the map layer, a set of content control objects, wherein each content control object enables a user to load one or more content items via display objects superimposed on the map layer;

wherein the set of content control objects is selected from a collection of available content control objects based upon: (a) the current navigation data; and (b) one or more attributes of the user.

One embodiment provides a computer implemented method for displaying building information to a user via a touch/gesture driven user interface that is rendered on a display screen, the method including:

displaying a map layer, the map layer including image data representative of a facility, wherein the user interface is navigated by way of pan and zoom operations defined with respect to the map layer; and enabling loading one or more content items via display objects superimposed on the map layer; enabling the user to move a given display object between:

a map bound layer, wherein the display object is bound to the map layer for pan and/or zoom operations; and (ii) a map unbound layer, wherein the position and/or size of the display object remains constant relative to the display screen independent of pan and/or zoom operations.

One embodiment provides a computer implemented method for sharing content, the method including:

displaying a touch/gesture driven user interface that is rendered on a display screen coupled to a first terminal, wherein the user interface includes:

a map layer including image data representative of a facility, wherein the user interface is navigated by way of pan and zoom operations defined with respect to the map layer; and one or more display objects superimposed on the map layer, wherein each display object is configured to display content associated with a building resource;

in response to a "throw" gesture having predefined characteristics, providing a signal to a second terminal in networked communication with the first terminal, thereby to make the content associated with a building resource.

One embodiment provides a computer implemented method for sharing content, the method including:

displaying a touch/gesture driven user interface that is rendered on a display screen coupled to a first terminal, wherein the user interface includes:

a map layer including image data representative of a facility, wherein the user interface is navigated by way of pan and zoom operations defined with respect to the map layer; and one or more content control objects superimposed on the map layer, wherein each content control object is configured to enable launching of a content display object, wherein the content display object associated with a building resource;

wherein the user interface is configured to enable persistent display of launched content display object at a launch location, such that following navigation away from a map position, such that a given content display object is no longer on-screen, and return to that map position, which requires re-loading of map image data for that position, the given content display object remains in its launch location.

One embodiment provides a computer implemented method for displaying building information to a user via a touch/gesture driven user interface that is rendered on a display screen, the method including:

displaying, in a primary region of the user interface, a first map layer, wherein the first map layer includes image data representative of a facility, wherein the user interface is navigated by way of pan and zoom operations defined with respect to the map layer;

displaying a multi-level navigation interface, wherein the multi-level navigation interface displays a series of stacked map layer previews, wherein the stacked map layer previews are defined relative to a common origin, wherein one map layer preview is representative of the first map layer and another map layer preview is representative of a second map layer;

enabling a user to interact with the multi-level navigation interface thereby to select a desired one of the stacked map layer previews; and in response to the user's selection of the map layer preview representative of a second map layer, displaying the second map layer in the primary region of the user interface.

One embodiment provides a computer program product for performing a method as described herein.

One embodiment provides a non-transitive carrier medium for carrying computer executable code that, when executed on a processor, causes the processor to perform a method as described herein.

One embodiment provides a system configured for performing a method as described herein.

Reference throughout this specification to "one embodiment", "some embodiments" or "an embodiment" means that a particular feature, structure or characteristic described in connection with the embodiment is included in at least one embodiment of the present invention. Thus, appearances of the phrases "in one embodiment", "in some embodiments" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with and means comprising.

As used herein, the term "exemplary" is used in the sense of providing examples, as opposed to indicating quality. That is, an "exemplary embodiment" is an embodiment provided as an example, as opposed to necessarily being an embodiment of exemplary quality.

BRIEF DESCRIPTION OF THE DRAWINGS

Embodiments of the invention will now be described, by way of example only, with reference to the accompanying drawings in which.

DETAILED DESCRIPTION

Figure 1A:
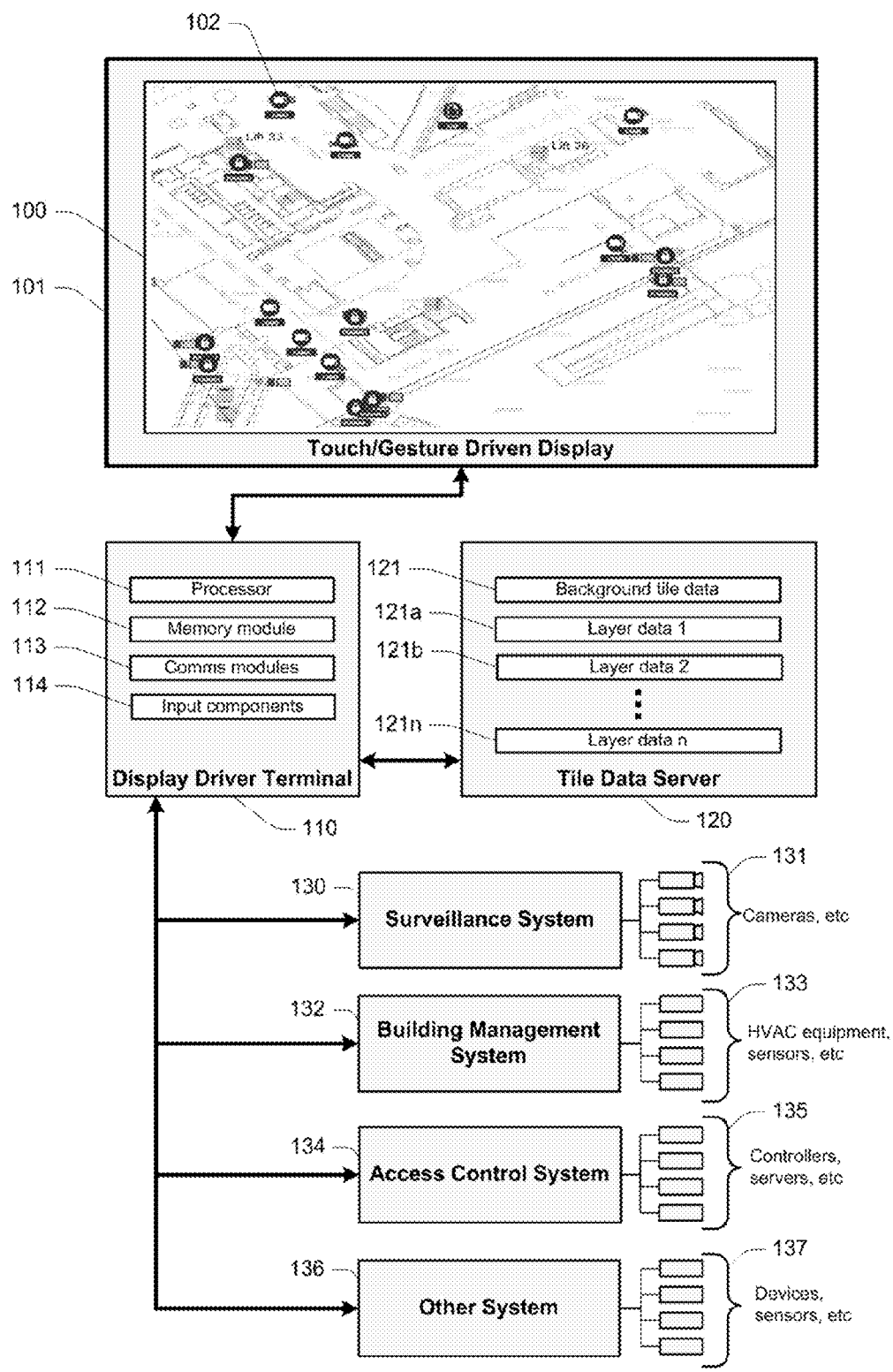
FIG. 1A schematically illustrates a framework according to one embodiment.

Described herein are frameworks, devices and methods configured for enabling display for facility information and content, in some cases via touch/gesture controlled interfaces. Embodiments of the invention have been particularly developed for allowing an operator to conveniently access a wide range of information relating to a facility via, for example, one or more wall mounted displays. While some embodiments will be described herein with particular reference to that application, it will be appreciated that the invention is not limited to such a field of use, and is applicable in broader contexts.

In overview, the technologies described herein are predominately intended to facilitate provision of a rich user interface for rendering on one or more touch/gesture controlled displays, such as wall-mounted glass displays. Such displays are preferably relatively large, for example having a screen size in excess of 42 inches.

As used herein, the term "touch/gesture controlled" refers to a display/interface in respect of which the primary mode of control is either touch (for example via touchscreen input technology) or gesture (for example via a motion sensor arrangement), or by way of a combination of touch and gesture. The term "gesture" should be read sufficiently broadly to include gestures made via a touchscreen interface and gestures made for recognition by motion sensing equipment (and other such feature-recognising equipment). There may be additional modes of control present, including the likes of voice or peripheral inputs (such as keyboards, mice, touch devices, and so on).

In some cases, aspects of the technology are described by reference to functionalities provided/observed via a user interface. In such cases, embodiments may take the form of client, server, and other computing devices (and methods performed by those devices) thereby to provide such functionalities.

Technologies described below provide for a touch/gesture controlled interface that enables an operator to access information and content relating to a facility (for example a building or a region including multiple buildings). This information and content may relate to one or more "facility systems" or "building systems" (with the term "facility" being used to describe a site defined by one or more buildings and/or other locations), being systems defined by information technology components that make available such information and/or content. Examples of such facility systems include:

Video surveillance systems, which provide access to live video data from one or more cameras located in the facility.

HVAC systems, which provide access to control and monitoring of HVAC components (such as chillers, air handling unity, thermostats, and so on). This may be provided by a broader building management system.

Access control systems, which include access control devices and associated control systems (for example to control access through doors and the like, and monitor movement through such doors).

Energy management systems, which provide access to monitoring and/or controlling of energy consumption in a building.

A general objective for technologies described herein is to provide an effective, powerful, and easy-to-use touch/gesture controlled user interface, and associated back-end framework.

Framework Overview

A first exemplary framework is illustrated in FIG. 1A. Other exemplary frameworks are shown in further figures, and similar reference numerals have been used where relevant. Major components shown in FIG. 1A are:

A touch/gesture driven display 101, which is configured to enable rendering of a map-based user interface 100.

A display driver terminal 110, which is configured for driving user interface 100 (for example in terms of processing user inputs, obtaining data from remote sources, and rendering data on the display. This is either integrated with display 101, or coupled to display 101 by a HDMI cable (or other form of data cable).

A tile data server, which maintains map and layer data for the map-based user interface 100. This is configured to communicate with display driver terminal 110 via a network connection.

A set of facility system IT components which provide data underlying content accessible via interface 100. These include a surveillance system 130 (which includes a plurality of cameras 131), a building management system 132 (which includes HVAC components, sensors, etc 133), and access control system 134 (which includes access control devices, servers, etc 135) and another system 136 (which includes devices/components 137). These communicate with driver 110 via network communications, optionally via one or more intermediary servers (not shown).

Figure 6:
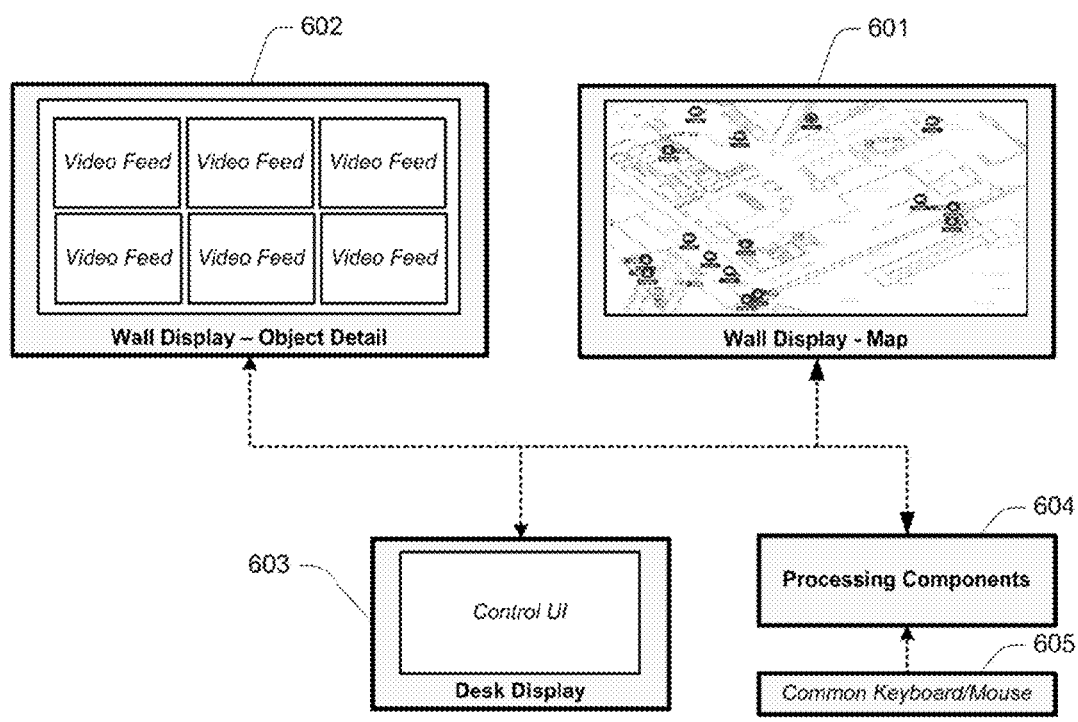
FIG. 6 illustrates a screen arrangement according to one embodiment.

An alternate multi-screen arrangement is illustrated in FIG. 6, and described further below.

Map-based navigation interface 100 includes image data representing a map, such as a floorplan. This is rendered on-screen as a map layer (for example a background map layer). Overlaid on the image data representing a map are various objects, including a plurality of content control objects (CCOs) 102. In some embodiments described herein, CCOs take the form of orbital menu objects. However other GUI components may be used, for example CCOs such as those described by reference to FIG. 7. A user interacts with such CCOs to gain access to content and/or functionality. For example, where a CCO relates to a camera, interaction with the CCO provides access to a live video feed from that camera (optionally in combination with other content/controls).

Interface 100 is able to be navigated in terms of pan and zoom. For example, motion/touch gestures such as swiping, pinching, and the like may be used to effect such navigation as is customary for touch/gesture driven displays. The manner by which interface handles such navigation is dealt with in more detail below.

In this embodiment, interface 100 is provided by way of display driver 110, which may be provided via a computing device having an interface able to be coupled to display 101 (for example an HDMI output or the like). Display driver 110 includes a processor 111 that enables execution of software instructions, for example software instructions maintained on a memory module 112. Communications modules 113 (such as Ethernet network adaptors, WiFi, or the like) enable interaction with remote devices. In this regard, various software functionalities provided via interface 100 may be derived from software executing at display driver 110 and/or at other distributed terminals. For instance, whether a given functionality is provided by locally or merely executing code may be a matter of design choice, based upon optimisation of resources. In this regard, any functionality/data shown in FIG. 1A as being remote of display driver 110 may, in other embodiments, be provided in whole or in part locally by display driver 110.

Memory module 112 maintains software instructions for a user interface module which is configured to control rendering of interface 100. This user interface module is responsive to user inputs (via input components 114, which may include touch-based and gesture-based inputs, and the like) for controlling interface 100. Controlling display 100 includes the likes of processing inputs indicative of commands for zooming, panning, accessing content, shifting vertical levels, and so on (discussed in more detail further below), and processing those inputs thereby to provide desired functionality.

In terms of panning and zooming, in the embodiment of FIG. 1A, display driver 110 is in communication (over a network or Internet connection) with a tile data server 120. This enables the provision of a tile-based arrangement for displaying map data and layer data. In overview, the image data displayed via interface 100 includes a background map layer (defined by background tile data 121), and one or more layers that are able to be superimposed on the background map (defined by layer data 121a-121n). These are discussed in more detail further below.

Figure 1B:
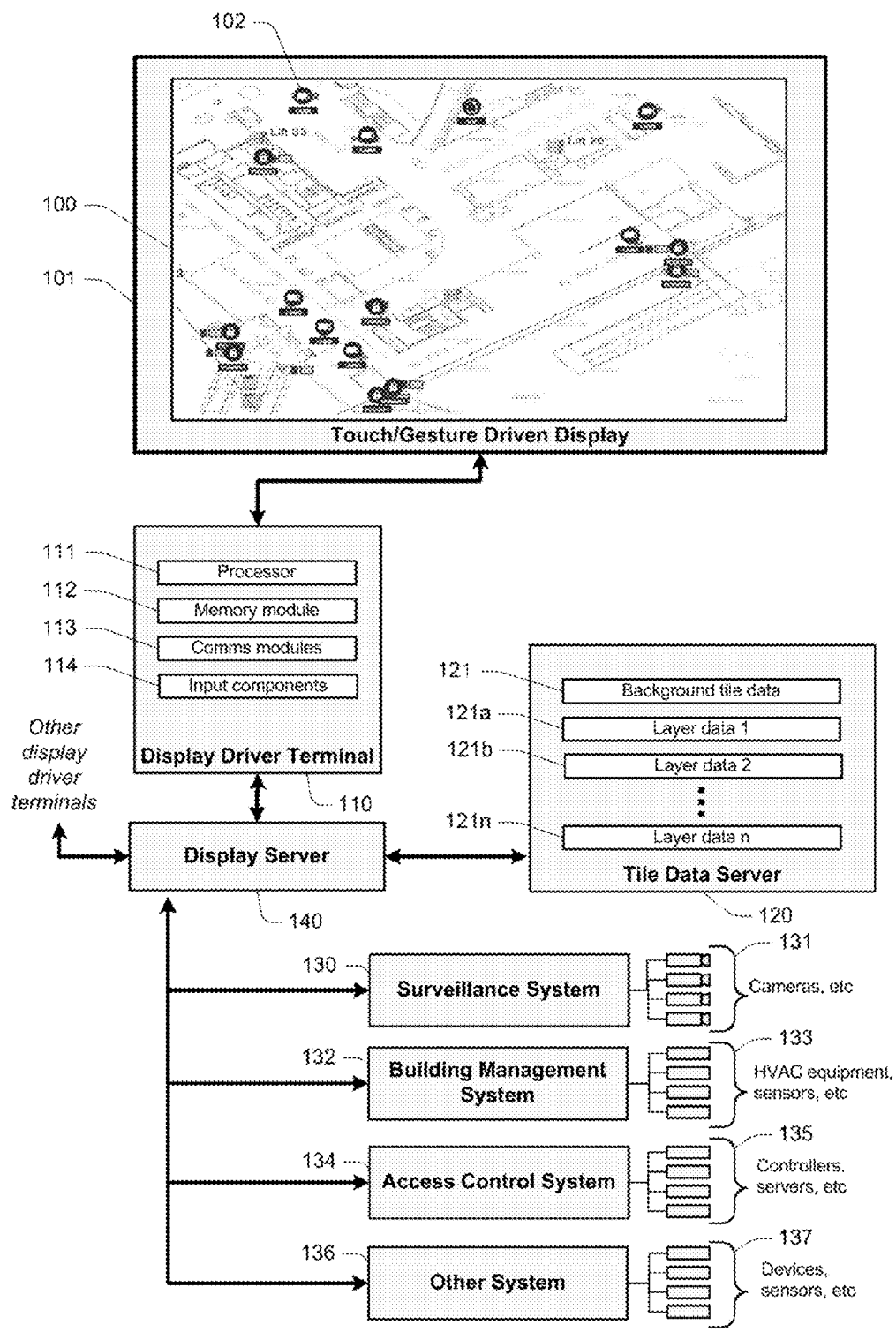
FIG. 1B schematically illustrates a framework according to one embodiment.

FIG. 1B illustrative an alternate configuration whereby a display server 140 interposes display driver terminal 110 (and optionally a plurality of further display driver terminals coupled to respective displays) with the tile data server and other systems. In this manner, display server 140 operates substantially like a web server for the present technologies. By such an approach, the user interface may be loaded into and rendered within a web browser application executing on a display driver terminal (or other device). This allows for scalability, and reduces the need for a display driver terminal to possess any special characteristics or software.

Figure 1C:
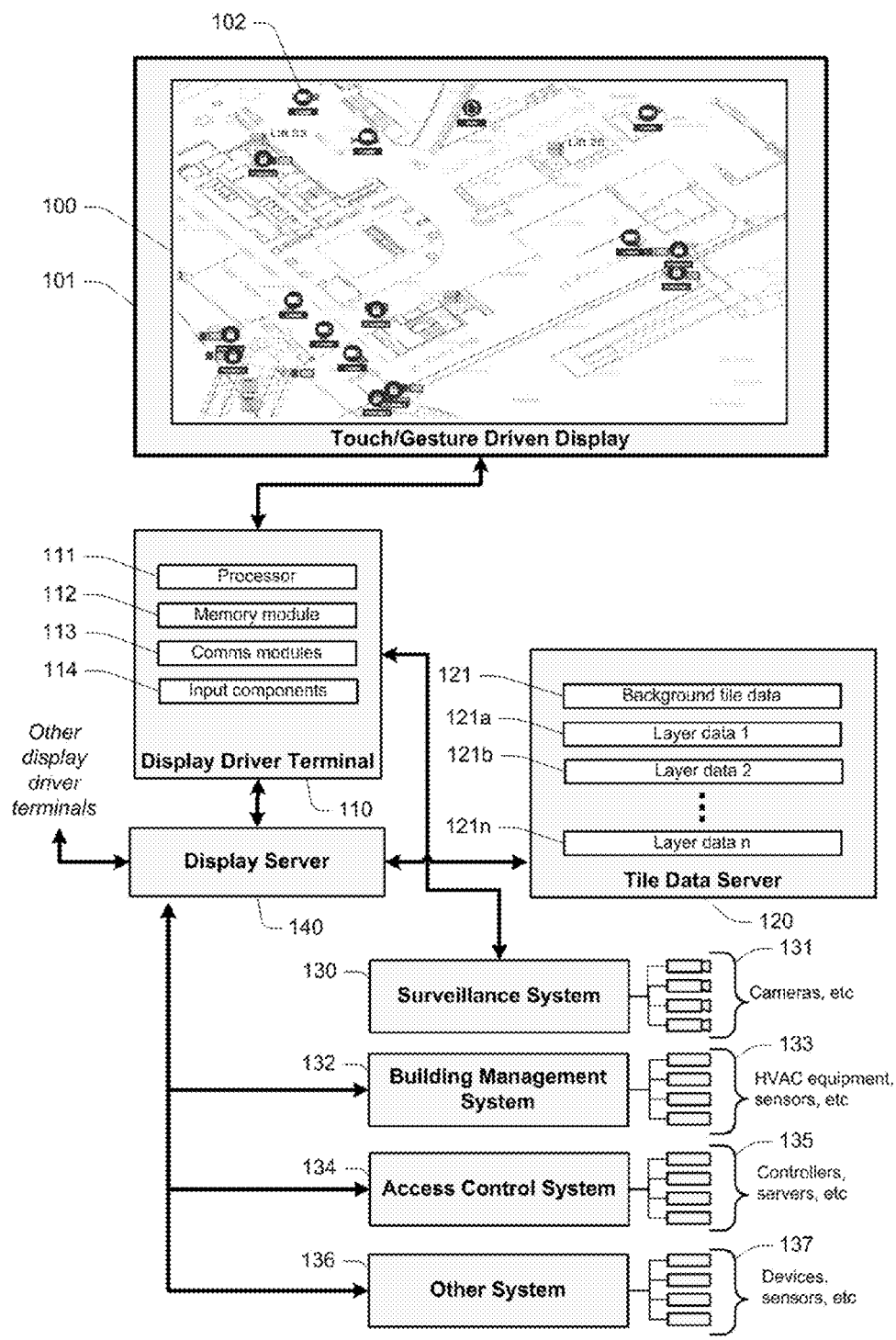
FIG. 1C schematically illustrates a framework according to one embodiment.
Figure 1D:
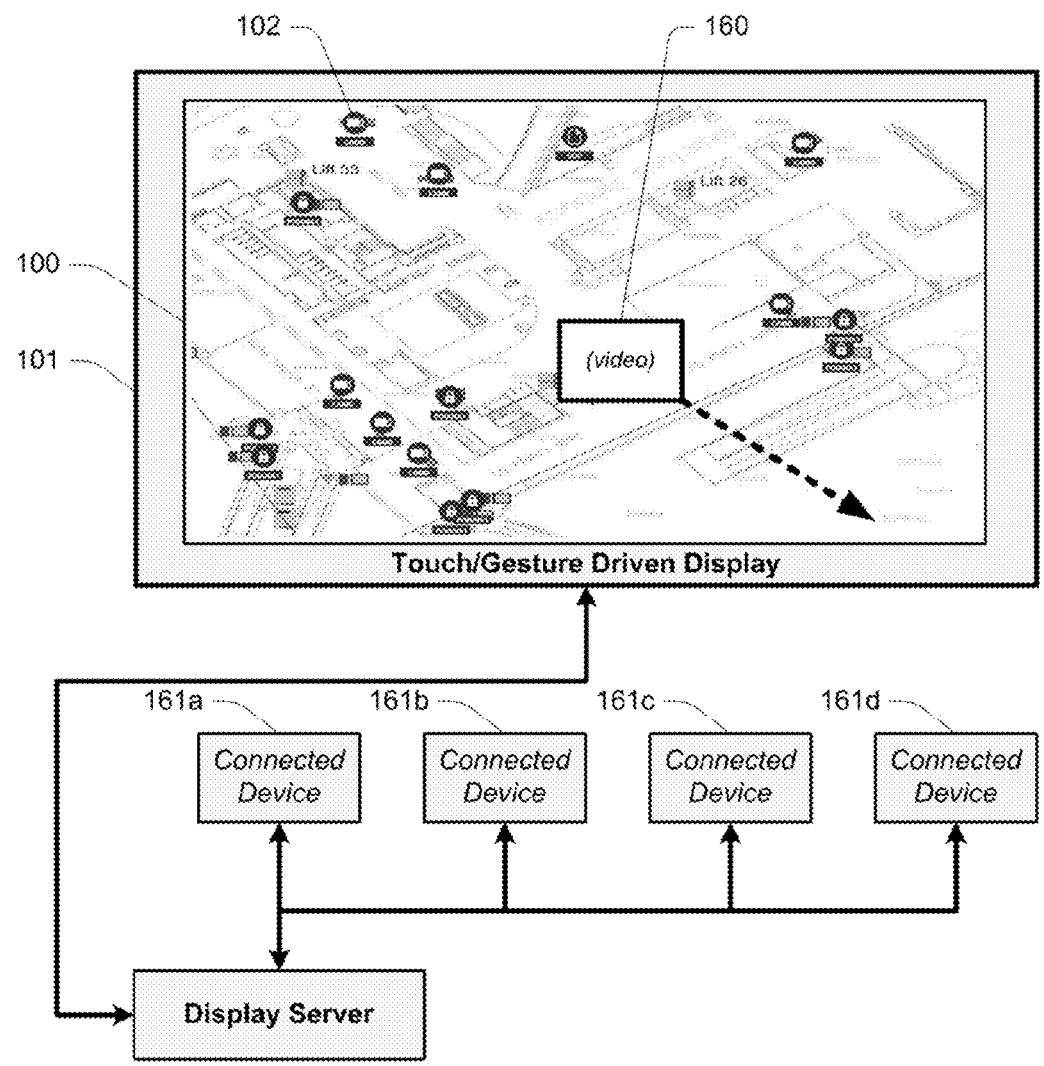
FIG. 1D schematically illustrates a framework according to one embodiment.

FIG. 1C illustrates another configuration, whereby display driver terminal interacts directly with surveillance system 130, as opposed to via server 140. This configuration is used to more efficiently manage bandwidth in the context of displaying live video data via interface 100. In overview, in some embodiments a display object rendered in interface 100 is configured to display live video data from one of cameras 131, and for this purpose the display object includes data that enables the creation of a direct connection to the relevant camera via system 130. In some cases this includes initiating a socket connection via a specified camera server (specified by a network address, for instance) of system 130 thereby to coordinate the delivery of live video data for display in the display object of interface 100.

It will be appreciated that other framework-level variations may be applied for further embodiments.

User Interface Components

Figure 2:
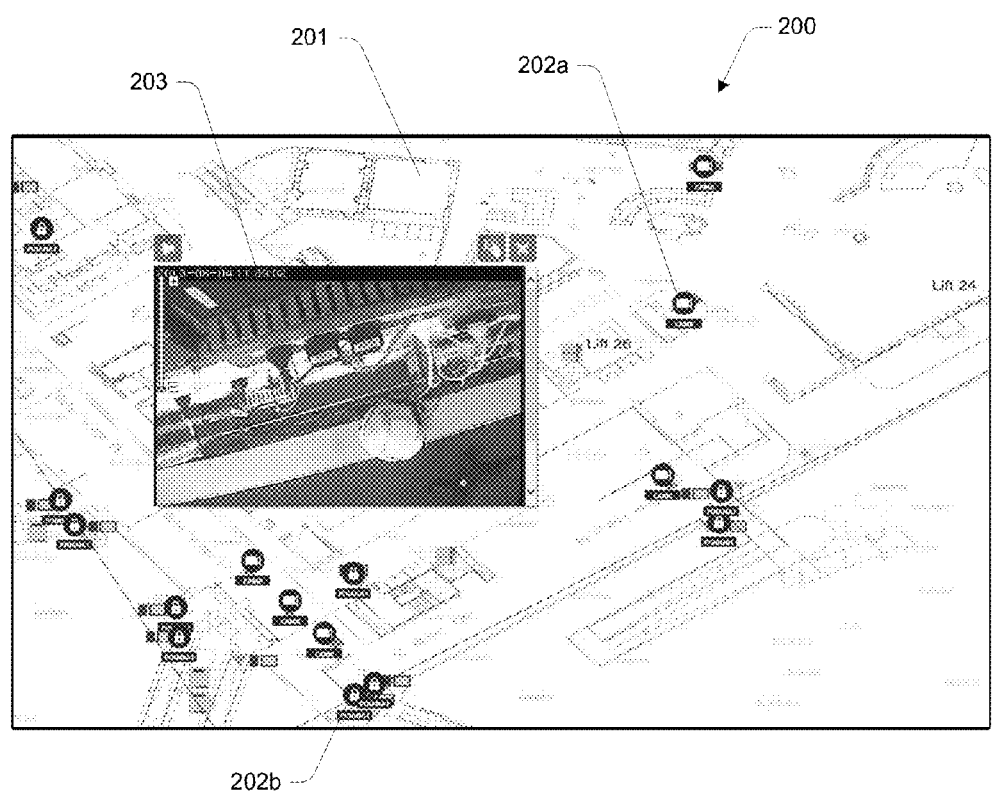
FIG. 2 illustrates an exemplary screenshot according to one embodiment.

FIG. 2 illustrates an exemplary screenshot 200 according to one embodiment. This is provided thereby to assist in explanation of various user interface components referenced throughout the specification.

A background map layer 201 is illustrated, in this case being a substantially two-dimensional isometric floorplan. This shows artefacts such as walls, doors, stairs, and the like. The floorplan may show a single building, or multiple buildings (with intermediate areas). The floorplan may include multiple substantially two-dimensional images representing different vertical zones (such as floors in a building). In some cases only a single vertical zone is displayed, with a navigation interface allowing navigation between vertical zones. In other cases multiple separate map images for respective vertical zones are shown alongside one another. In such cases preferably visual features (such as coloured lines) are provided thereby to indicate pathways between levels, for instance at stairwells and lifts. By way of example, in one embodiment a coloured line connects a stairwell in one map image to a corresponding stairwell in another map image, thereby to visually indicate functional connection between the stairwells.

Content control objects (CCOs) 202a and 202b are shown. CCO 202a includes a camera icon, and is bound to a resource in the form of a camera managed by a surveillance system. CCO 202b is bound to the resource in the form of an access control device managed by an access control system.

CCO 202a is able to be operated by a user thereby to launch a content display object 203 (in this case being a video display object), which is configured to display a content item (in this case being streaming live video) for its bound resource (in this case being a camera). Various other forms of content display objects and content items may be present, for example depending on the nature of resources to which CCOs are bound.

Content Control Objects (CCOs)

As noted above, interface 100 includes a plurality of content control objects (CCOs) 102, which are overlaid on (or otherwise visible within) a map-based interface. For example, a CCO may be defined by menu objects, such as a radial/orbital menu object. This allows a user to interact with a CCO thereby to access content, for example to launch a display object for a desired content item (for example to view live video data from a camera). In some cases a CCO is configured to automatically launch a display object where predefined conditions are met (for example to enable automated launching of video display objects when a user navigates to a predefined pan and zoom location). These predefined conditions may include alert conditions (for instance, in one example an alert is raised for a given camera when motion is sensed, and that causes automatic launching of a video display object).

Each CCO is bound to one or more facility system components, such as one or more cameras of surveillance system 130, a sensor of a component monitored by building management system 132, and so on. This binding is configured to enable at least either or both the following:

A user of interface 100 to access content made available by the facility system component (for example live video data from a camera, or a value from a sensor). For example, by clicking on a CCO, a user is able to access such content, which is preferably displayed overlaid on the map display (optionally in a content display layer).

Downstream pushing of data from the component (or supporting system) to interface 100, for example where an alarm condition has been reached. For example, a visual alarm indicator may be applied to or adjacent a CCO based on such downstream pushing of data.

Data indicative of CCOs is maintained at a server device, optionally being a server device that is additionally responsible for delivering image data for the map.

In some embodiments, a CCO is defined by data indicative of:

A position on the map at which the CCO is to be located (which may vary depending of zoom position and/or CCO aggregation rules).

A reference to the resource to which the CCO is bound (or, in some cases, resources to which the CCO is bound). This allows binding and/or other data sharing to occur.

Data indicative of display parameters. This may include data indicative of an icon for the CCO (for example a CCO bound to a camera in a surveillance system may carry a camera icon). It may also include instructions for the provision of user interface components (for example menu items that are to be displayed via an orbital menu, and how those operate) for example via JavaScript Object Notation (JSON).

This allows a CCO to be loaded in a functional manner for the purposes of interface 100. CCO processing operations (for example data handling) may be performed at a client or server side (or a combination of both) depending on matters of subjective choice in specific implementations.

Background Map Layer

As noted above, interface 100 includes a background map layer. The map may be two or three dimensional, although in the case of three dimensional maps it is preferable that it represents a region of substantially common vertical position (for example a single floor in a building). In some examples multiple maps maintained in a stackable form, thereby to allow an operator to view different vertical positions (for example a separate map for each floor of a building, with each map being defined relative to a common set of referential spatial coordinates). In the example of FIG. 1A, the map is shown as a substantially two dimensional map, being a two dimensional map that displays limited perspective on some or all features thereby to enhance viewability. An isometric view is shown, however alternate views may also be used. In some cases views shift between plan and isometric depending on a level of zoom.

Figure 3:
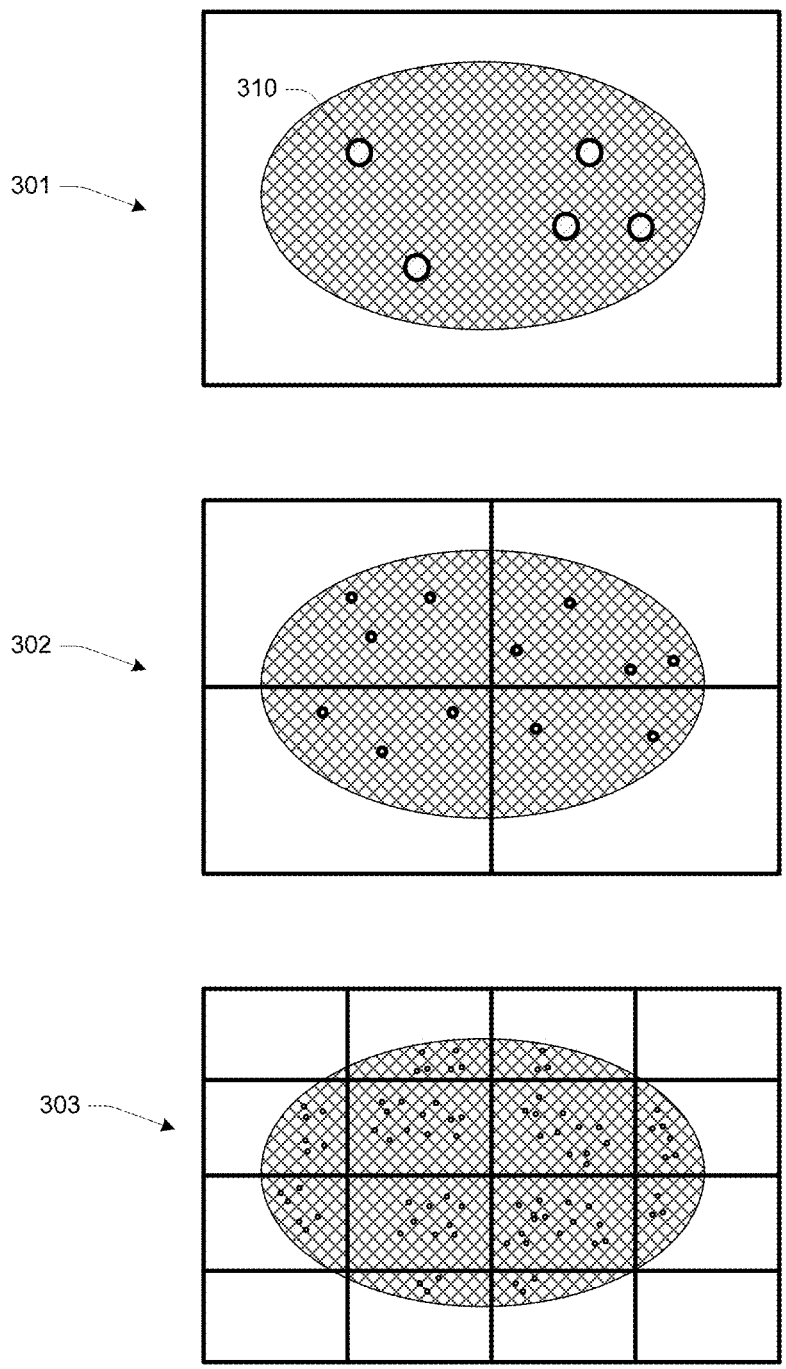
FIG. 3 illustrates a user interface progression sequence according to one embodiment.

Data to enable the rendering of the background map layer at a variety of resolutions is maintained in background tile data 121 of tile data server 120. In this regard, a tile-based approach is used to manage display and resolution, as shown in FIG. 3. Background map tile data is defined at varying resolution levels, with a respective number of tiles for each resolution level. From a definitional perspective, these are a highest level (301 in FIG. 3) and move down to lower levels (302 and 303 in FIG. 3). Each lower level is defined by an increased number of tiles as compared to its preceding level above. Affine transformations are preferably used to manage zooming within a given tile.

In the context of the background map layer, level 301 is defined by a full mapped view of a facility (in this example represented by an oval shape), defined at a predefined resolution level. This predefined resolution level is optionally selected based on a maximum optimal resolution for display device 101 (or based on a maximum optimal resolution for an anticipated display device, based on current technological norms). Level 302 is defined by four partial views, each of which being defined at the same predefined resolution level as the entire view of level 301. That is, in terms of total number of pixels, the four tiles of level 302 define, in combination, four times the number of pixels as the single tile at level 301. In level 303 there are sixteen tiles, again each at the same predefined resolution level as the tiles at levels 301 and 302. This means that, by way of example, a much greater level of detail and granularity of the map is able to be provided in the tiles at level 303 compared with levels 302 and 301.

In terms of operation, based upon a navigation command (such as a pan or zoom), display driver 110 provides positional information to server 120. This positional information is indicative of location (for example relative to set of axis defined relative to the overall full view map in 301) and a zoom state. Based on this positional information, server 120 selectively delivers image data from one or more tiles for the background map layer.

As an example, assume level 301 represents a zoom value of 100%, level 2 represents a zoom value of 200%, and level 3 represents a zoom value of 400%. For zoom levels from 100% to <200%, a zoom operation is applied directly to the single tile of level 301. Once the zoom level reaches/surpasses 200%, the server 120 delivers image data from one or more of the tiles of level 302 (depending on vie position relative to tile boundaries). Preferably, on transition between tiles, the preceding tile is used at non-optimal resolution as a preview during download and rendering of the new tile.

Tile-Based CCO Management

In some embodiments, CCOs displayed in response to zoom position, with an increased number of CCOs becoming visible at higher zoom levels. This may be achieved by reference to the tile-based approach discussed above that is used for the background layer. That is, CCO positions are defined for each tile, so that when a tile is loaded for the background image, CCOs for positions defined for that tile are also loaded.

FIG. 3 illustrates a plurality of CCOs (one labelled as 310, by way of example). It will be noticed that the number of CCOs increases from level 301 to level 302, and from level 302 to level 303. From an end user perspective, the objective is to avoid cluttering the on-screen area with too many CCOs. There are a few approaches for achieving this:

Manually defining each content layer tile, by defining locations for CCOs.

A set of automated rules for CCO amalgamation, such that where a predefined CCO density is met (for example in terms of proximity, number on-screen, etc) those are automatically combined into a single CCO from which content from both constituent CCOs is accessible. By such an approach, CCOs need only be manually created at the lowest level (i.e. for each tile at level 303 in FIG. 2) higher level views are automatically generated.

A combination of manual definition and automated rules.

Preferably, upward amalgamation of CCOs results in a child-parent relationship (in the case of FIG. 3 being a child-parent-grandparent relationship between the three levels). In this relationship, data binding is upwardly aggregated. That is, a grandparent CCO is functionally bound to all child facility system components. In some embodiments this means that all alarms for components bound to child CCOs are visible via the child, parent and grandparent CCOs. Furthermore, content related to the facility system components (e.g. video data, temperature data, etc) for components bound to child CCOs is preferably able to be accessed via the child, parent and grandparent CCOs.

So as to provide an example, consider a set of four level 303 tiles which correspond to a common single level 302 tile. Assume there are four camera-type CCOs across the set of four level 303 tiles (although not necessarily one in each), with each of those CCOs being bound to a respective individual camera. That is, each of those CCOs allows a user to launch a video window pop-up from its respective camera. These four CCOs at level 303 are replaced by a single camera-type CCO at level 302, with this level 302 CC) being bound to all four cameras (and being configured to allow a user to launch a video window pop-up from any of the four cameras, or in some cases a multi-camera view comprising live video from all four).

CCO Layers

In some embodiments, CCOs are defined in multiple content layers (shown in terms of layer data 121*a-n* in FIG. 1A). These content layers may respectively include one or more CCOs. In some embodiments there are respective layers for content types (for example separate content layers for surveillance, HVAC, mechanical, electrical, financial), each having CCOs for that content type. In some cases CCOs include graphical icons that identify the content type with which they are associated (for example a CCO associated with surveillance content may carry a camera icon).

In some embodiments, CCO aggregation may occur by combining CCOs from separate layers. For example, based on an aggregation algorithm, where two CCOs are to be displayed, and these are located within a threshold proximity, an algorithm is executed to combine their respective display parameter data (for example combining JSON data) thereby to provide a single CCO that provides all (or a selection of) the functionalities that would otherwise be provided by two separate CCOs.

CCO layers are also helpful in enabling filtering of CCO display, for example in based on user attributes and/or user-defined filters. This is discussed further below.

CCO Display Relative to Zoom Level

In various embodiments, as a result of CCO layers, tile-based management, or other approaches, logic that determines which CCOs are displayed is related to a zoom level. That is, a given CCO is visible by default only once a prerequisite zoom level is reached.

In some embodiments, this aspect of the technology is enhanced by way of rules which define circumstances in which a given CCO may be visible at a zoom level preceding its prerequisite. This includes defining conditions (for example the presence of an alarm condition) which, if satisfied, result in either (i) a given CCO being visible at all zoom levels; or (ii) a given CCO being visible at a zoom level directly or indirectly preceding its prerequisite zoom level.

CCO Display Management Based on User Attributes

In some embodiments, interface 100 is configured such that CCOs are displayed based on one or more attributes of a user (operator). That is, a user provides credentials to access interface 100, and based on these credentials (which may reference user attributes stored in a remote database), decisions are made (preferably at a server level) as to which CCOs are to be displayed in interface 100. In this regard, one embodiment provides a computer implemented method for displaying building information to a user via a touch/gesture driven user interface that is rendered on a display screen, the method including:

(i) based on current navigation data, displaying a portion of a map layer, wherein the map layer includes image data representative of a facility; and (ii) positioning, on the displayed portion of the map layer, a set of content control objects, wherein each content control object enables a user to load one or more content items via display objects superimposed on the map layer.

This method operates on the basis that the set of CCOs is selected from a collection of available CCOs based upon: (a)

the current navigation data (for example defined in terms of pan and zoom position); and (b) one or more attributes of the user.

In some cases each CCO is bound to at least one building resource, the one or more attributes of the user are indicative of access rights for building resources, and the set of CCOs is selected from the collection of available CCOs based upon the user's access rights with respect to the building resources to which the CCOs are bound. For example, a certain user has access only to view surveillance footage, and so only CCOs bound to cameras are shown.

In some cases, there is a plurality of building resource categories, wherein each building resource belongs to a building resource category. The one or more attributes of the user are indicative of access rights for building resource categories, and the set of CCOs is selected from the collection of available CCOs based upon the user's access rights with respect to the building resources to which the CCOs are bound. For example, this may be used in conjunction with a layer approach as disused above. Rather than determining whether or not to show a CCO on a per-CCO basis, the decision is made on a layer basis.

The user attributes may include the likes of a tag in a user ID file, permissions in a permissions table, or substantially any other approach. Preferably, each CCO includes data of the required user attribute (e.g. access permission) required.

In some cases the user attributes additionally include filtering parameters set by the user. For example, a user with access to video CCOs and HVAC CCOs may choose to filter thereby to only show video CCOs. In some cases the technical mechanisms for determining which CCOs are displayed vary between situations where access permissions are processed and where filters are processed.

In cases where a CCO is bound to multiple resources, user-attribute display involves additional challenges. That is, the CCO may appear differently depending on the user's attributes. There are a few ways in which this is managed in embodiments, for example:

A one-to-one relationship between CCOs and resources. CCOs may be aggregated together based on a set of rules, but this aggregation is performed following a determination as to which CCOs are to be displayed. For example, in respect of one user a map position (location and zoom level) may include a video CCO and HVAC CCO aggregated together, but for another use that same map position may only include the video CCO (if the user does not have access rights for HVAC, or has filtered out HVAC).

Algorithms for enabling modification of data for a CCO that is bound to multiple resources, such that content is available only for a resource where the user has access.

Using multiple CCO definitions for multi-resource-mound CCOs, so that separate data is stored to allow loading for a reduced number of the bound resources where appropriate.

CCO display management based on user attributes is very useful in the context of interface 100, as it allows a single interface framework to server multiple purposes, based on varying operator scope of responsibilities, access rights, roles, and current tasks. Interface 100 is therefore, at the back end, able to be configured to provide a wide range of rich content, whilst at the front end only content determined to be appropriate for a given user is displayed on the map.

User-Specific Content Layer

In some embodiments a user is able to customise the location of CCOs. For example, a user is able to add a new CCO, which includes selecting a resource to which it is to be bound. The newly created CCO may reside in a user-specific content layer, which is in some cases available only to that user (and loaded automatically for that user), and in other cases published to other users.

In some embodiments a user is additionally/alternately enabled to customise menu items accessible from a given CCO. Again, in some cases these customisations are made exclusively for the user in question, and in other cases they are published for other users (for example by updating the CCO data such that updated CCO data is loaded by the next user to navigate to a position containing that CCO).

Multi-Level Map Navigation

As noted above, in some cases only a single vertical zone is displayed via the background map layer, even in the case of a multi-level facility. In such cases, a navigation interface may be provided thereby to enable navigation between vertical zones (for example between floors).

One embodiment provides a method including, displaying, in a primary region of the user interface, a first map layer, wherein the first map layer includes image data representative of a facility, wherein the user interface is navigated by way of pan and zoom operations defined with respect to the map layer. The method also includes displaying a multi-level navigation interface, wherein the multi-level navigation interface displays a series of stacked map layer previews. The stacked map layer previews are defined relative to a common origin. That is, a certain longitude-latitude coordinate set is commonly defined across all map layers, allowing those layers to be stacked in a meaningful manner. In some embodiments the navigation interface is superimposed on the map layer.

In this case, one map layer preview is representative of the first map layer and another map layer preview is representative of a second map layer. A user is enabled a user to interact with the multi-level navigation interface thereby to select a desired one of the stacked map layer previews. For example, this may include a gesture driven selection, optionally effectively scrolling upwards/downwards through the stack. In response to the user's selection of the map layer preview representative of a second map layer, the second map layer is displayed in the primary region of the user interface.

Figure 5:
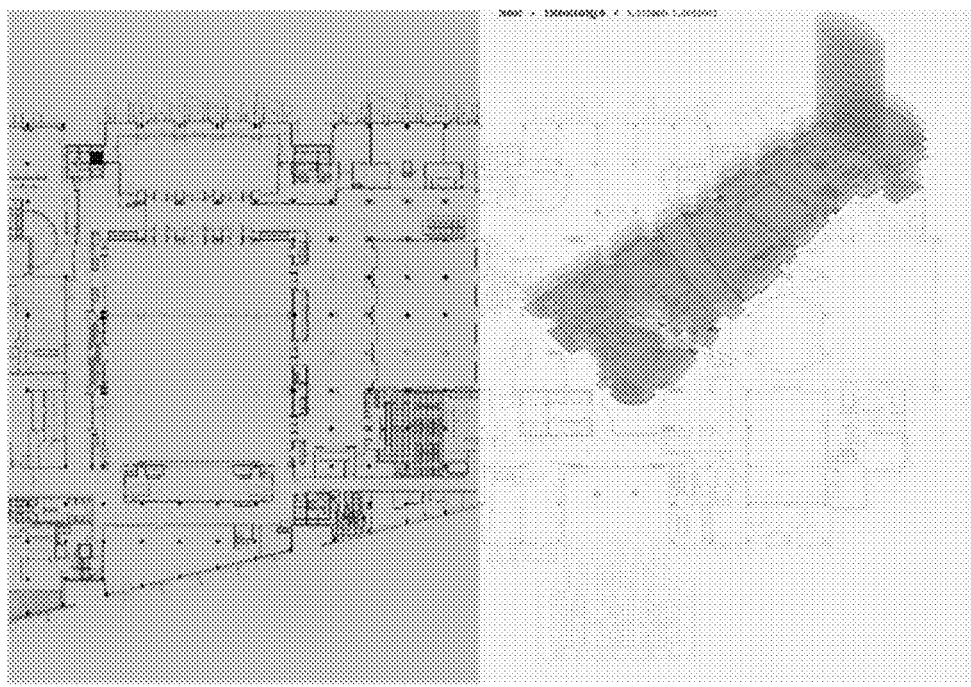
FIG. 5 illustrates an exemplary screenshot according to one embodiment.

In some cases the series of stacked map layers are defined by two-dimensional isometric views stacked thereby to provide a three-dimensional representation of a building defined by floors respectively represented by the layers. This is shown in FIG. 5, which shows isometric staked views for multiple levels alongside a two-dimensional floorplan for one level.

In some cases prior to the user's selection of the map layer preview representative of a second map layer, the first map later is displayed for a region having a boundary defined in horizontal dimensions, and in response to the user's selection of the map layer preview representative of a second map layer, the second map layer is displayed in the primary region of the user interface for a region having the same boundary defined in terms of horizontal dimensions. That is, the user views the same region (in horizontal aspects) of a different level.

In some embodiments, in the case the pan and zoom location for the first map layer meet a first set of conditions, a first multi-level interface is displayed, and wherein, in the case the pan and zoom location for the first map layer meet a second set of conditions, a second multi-level interface is displayed. For example, this may be used for a multi-building facility: the multi-level interface is shown in respect of a building proximal (or defined around) the user's current navigation position.

Persistent Content Positioning

In some embodiments the user interface is configured to enable persistent display of launched content display object at a launch location. This is configured such that, following navigation away from a map position such that a given content display object is no longer on-screen, and return to that map position, which requires re-loading of map image data for that position, the given content display object remains in its launch location. That is, loaded content display objects appear to remain in persistent positions (relative to the map) as a user navigates the map. In some embodiments, in response to a user command via a content display object to launch a content item, storing context information for the launched content item, thereby to enable management of persistent display. Additionally, in the interests of conserving network and other computing resources, streaming of content by a given content display object is ceased when the given content item is not displayed on-screen.

Preferably, persistent display is able to be controlled by the user. For example, some embodiments provide a mechanism for the user to, by way of a single command, close all persistently displayed content display object. In another example, the user interface provides functionality for a user to select whether a given content display object is to be persistently displayed or, alternately, is to automatically close following navigation that causes the content item to no-longer be on-screen.

Transition of Content Between Map-Bound and Map-Unbound Layers

As discussed above, an operator is enabled to launch various content display objects within interface 100, for example a display object configured to present live video from a camera. In some cases, as noted above, the position of a content display item, once launched, is persistent, in that a user upon navigating away from, and subsequently returning to, a given map view position, content items launched for display at that position remain in place. Such content display objects may be considered as being map-bound, in that they are bound to the map in terms of pan and/or zoom operations. That is, the content display object remains the same size and position relative to the background map layer during operator-controlled navigation (for example a content display object becomes smaller during a zoom-out navigation).

In some embodiments, a user is enabled to transition content between a map-bound layer and a map-unbound layer. That is, such embodiments provide a computer implemented method including enabling the user to move a given display object between:

(i) a map bound layer, wherein the display object is bound to the map layer for pan and/or zoom operations; and (ii) a map unbound layer, wherein the position and/or size of the display object remains constant relative to the display screen independent of pan and/or zoom operations.

In some embodiments, when in the map bound layer, the display object is bound to the map layer for pan and zoom operations. In some embodiments, in the map unbound layer, the position and/or size of the display object remains constant relative to the display screen independent of pan and zoom operations. In some embodiments, in the map unbound layer, both the position and size of the display object remains constant relative to the display screen independent of pan and/or zoom operations.

The manner by which a display object is transitioned between the map-bound layer and map-unbound layer varies between embodiments. An exemplary approach is to use a "throw" gesture for progressing a given display object from the map bound layer to the map unbound layer. That is, interface 100 is configured to recognise a "throw" gesture made in respect of a content display object as a command not only to move the object made on the "throw" attributed (e.g. velocity and trajectory), but also as a command to transition the content item to a map-unbound layer. Handling of the map-unbound layer may be achieved via data and processing at the client or a server as matter of design choice.

Figure 4:
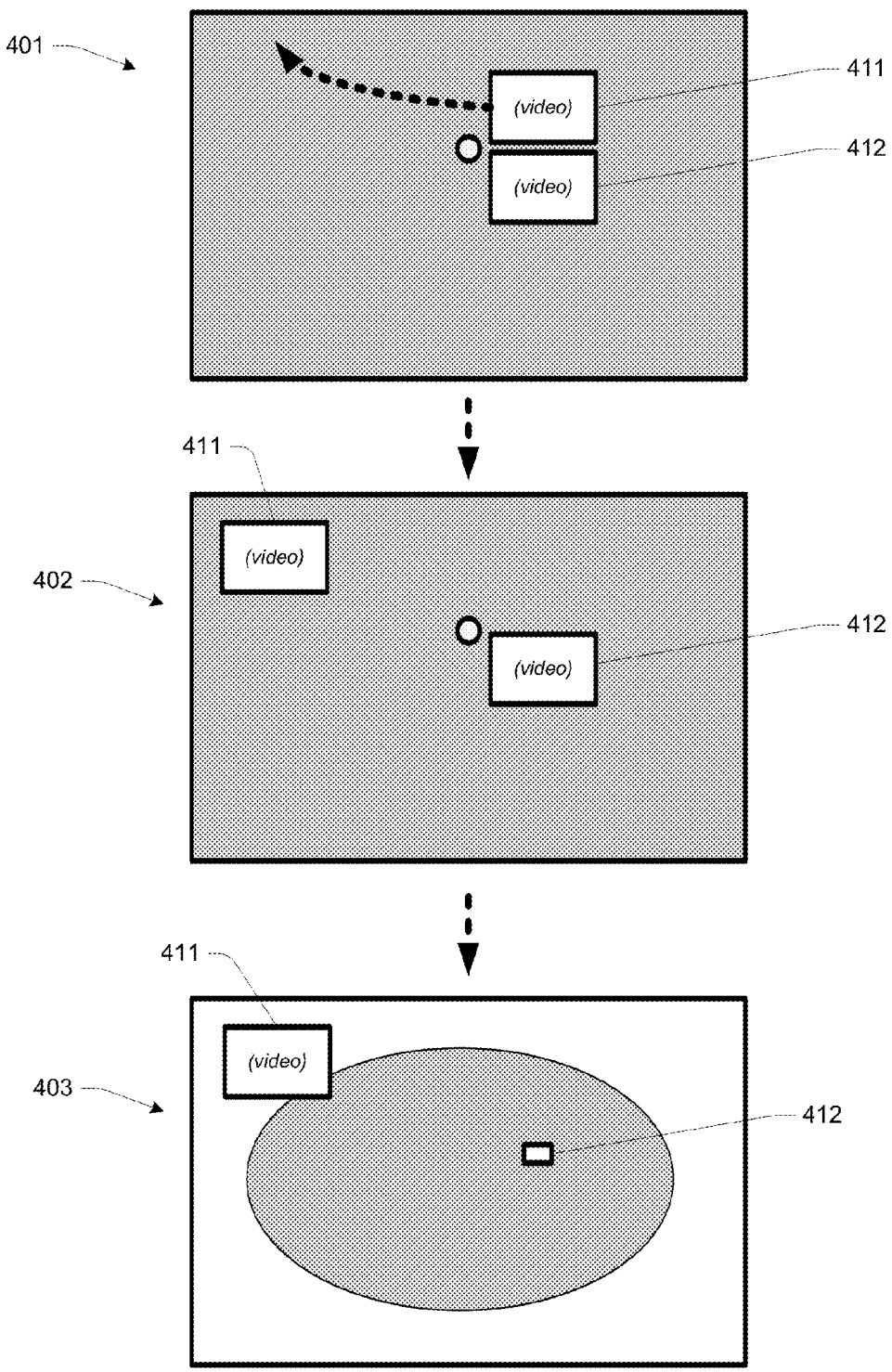
FIG. 4 illustrates a user interface progression sequence according to one embodiment.

FIG. 4 provides an example of how such transition operates, by reference to three exemplary simplified screenshots from interface 100. In screenshot 401 two video display objects (411 and 412) are launched, and by default reside in a map-bound layer. These are each configured to display live video data from respective cameras in a surveillance system. Object 411 is manipulated by way of a throw gesture, and moves into the position shown in screenshot 402. This throw manipulation also transitions object 411 into a map-unbound layer. Screenshot 403 shows interface 100 in a lower zoom position. In this screenshot, object 411 has remained the same size and position relative to the display screen, whereas object 412 has remained at a constant position and size relative to the background map layer.

Sharing of Content to Networked Devices

Some embodiments enable sharing of content between display 101 and other networked devices. For example, in one embodiment, in response to a "throw" gesture having predefined characteristics, the terminal providing interface 100 is configured for providing a signal to a second terminal in networked communication with the first terminal, thereby to make the content associated with a building resource. This is illustrated in FIG. 1B, which shows a plurality of second networked terminals 161a-d.

In some cases the user interface includes a plurality of peripheral throw locations, wherein each location is selectively associable with a specific remote terminal, wherein a "throw" gesture for a display object having characteristics representative of a given throw location cause the providing of a signal to the associated specific remote terminal in networked communication with the first terminal, thereby to make the content associated with a building resource. For example, a user is able to manually associate each throw location with a desired terminal.

In some embodiments sensing equipment is configured to determine the relative location of the second terminal with respect to the first terminal, thereby to enable determination of whether the "throw" gesture has a trajectory towards the second terminal. The sensing equipment may include image sensing equipment, coupled to either or both of the first terminal or the second terminal.

Multi-Modal Operation

In some embodiments a touch/gesture driven user interface is simultaneously controllable by multiple modes, including at least one gesture-driven mode, and at least voice-driven mode. Preferably, panning and zooming operations with respect to the map layer are controllable using commands including the name data for the building resources. In this regard, a voice-command processing module is optionally configured to have access to the name data, thereby to enable processing of voice commands in the at least one voice driven mode, wherein those commands are indicative of one or more aspects of the name data. The voice-command processing module is responsive to a command indicative of name data for a given one of the building resources for performing a command in respect of that building resource. This may include, in response to a predefined voice command indicative of name data for a given one of the building resources, the user interface is configured to navigate to an optimal map layer position, in terms of pan and zoom, for displaying that given one of the building resources.

By way of example, building resources may be named according to a location-specific hierarchy derived naming convention, for example: BuildingA, BuildingA/Level2, BuildingA/Level2/ConferenceRoom, and BuildingA/Level2/ConferenceRoom/Camera1. A given voice command may be matched against this name to determine whether it is likely to refer to that building resource. This need not require the full name or all aspects. For example, a voice command including "conference room" and "camera 1" may uniquely identify that resource (for example if there is only a single ConferenceRoom defined in the name data). The voice command processing is also preferably context dependent, favouring name data for resources shown on-screen. For example, if only one resource including Camera1 in its name is shown on-screen, then a command including "camera 1" is inferred to relate to that resource.

Multi-Screen Implementation

In some embodiments, the user interface is provided over multiple displays. An example is illustrated in FIG. 6, where three screens are used. A first screen 601, in this example being a wall display with touch/gesture controls, provides a map-based interface (for example as described in examples above). This map-based interface, based on a given point-in-time rendering, includes a plurality of CCOs (for example as described elsewhere herein).

A second screen 602 provides an object detail view, which is configured to provide a detailed view for a plurality of content items referenced by CCOs. For example, this may including displaying a plurality of video display objects, each providing a live video feed from a respective camera (with each camera being referenced by a given CCO). Other examples include display objects that provide status and/or configuration information for other facility items, such as access control devices, HVAC components, and so on.

Preferred embodiments provide a functionality whereby the system is configured to define a view on screen 602 responsive to CCOs visible on screen 601. This may occur automatically (for example following map repositioning) or responsive to a user command (for example the user clicks a button to "throw" a new view to screen 602 based on currently visible CCOs.

FIG. 6 also includes a third screen 603, which in this embodiment is a desk display (again preferably touch/gesture driven), which provides a control UI. This control UI preferably provides detailed information regarding the facility. In some cases a view on screen 603 is defined based on CCOs visible on screen 601, for example a "quicklist" which provides access to diagnostic information and the like for the relevant facility items.

Screens 601, 602 and 603 are driven by processing components 604, which may include multiple processing units. A common keyboard and mouse is preferably coupled to processing components 604, and configured to enable movement of a mouse cursor between all three screens.

Alternate CCO Implementation

Figure 7:
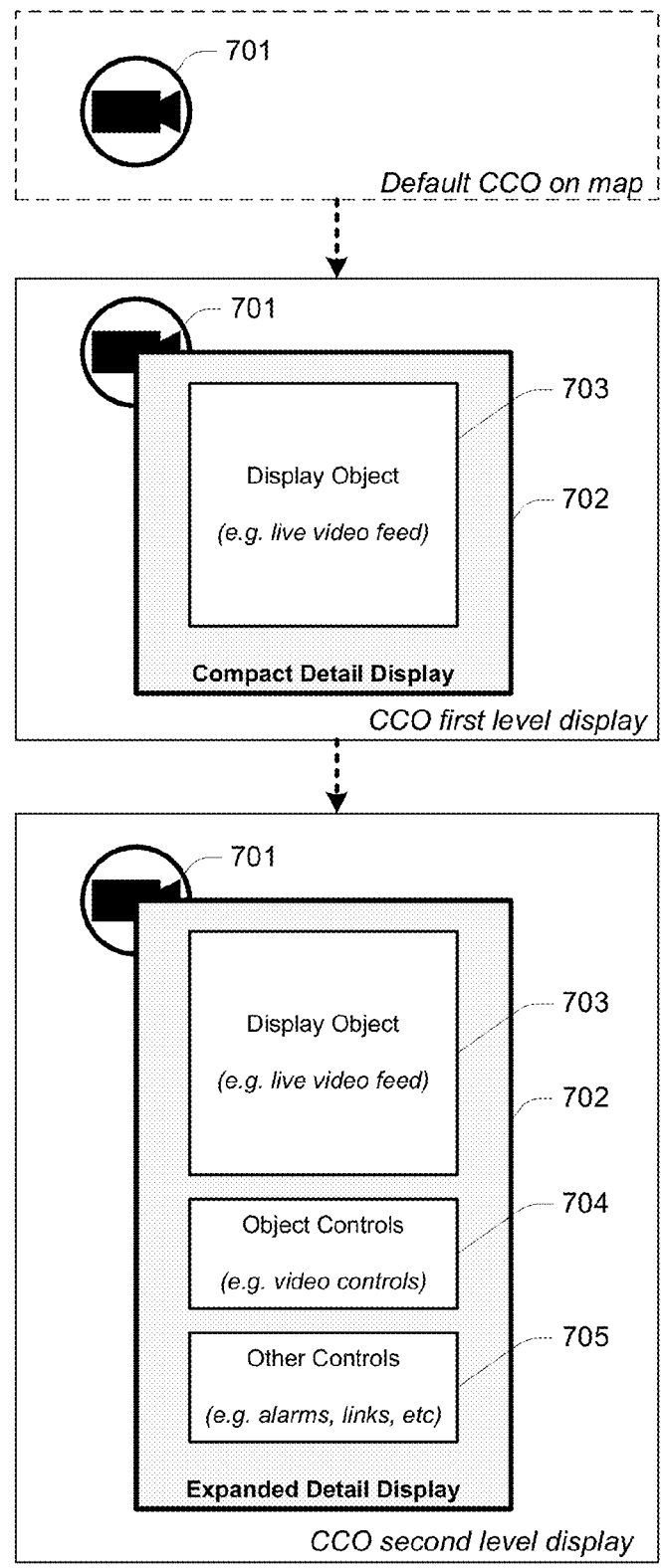
FIG. 7 illustrates a CCO progression according to one embodiment.

FIG. 7 illustrates an alternative CCO implementation, showing a progression of CCO display subject to user interaction. Icon 701 represents an exemplary CCO, in this case being for a camera (i.e. it is a camera icon). Interacting with this CCO results in the launching of a compact detail display 702, which includes a display object 703. This display object provides a view for the relevant facility item referenced by the CCO, for example a live stream of surveillance footage in the context of a camera.

Further interaction expands display 702 to provide an expanded detailed display, which additionally includes object controls 704 (for example video controls, such as rewind, record, pause, PTZ, and the like) and other controls 705. In some cases the other controls enable a user to associate links to other system user interface objects/views with the CCO.

CONCLUSIONS AND INTERPRETATION

It will be appreciated that the disclosure above provides various significant systems, methods, frameworks and methodologies for enabling display of facility information and surveillance data via a map-based user interface.

Unless specifically stated otherwise, as apparent from the following discussions, it is appreciated that throughout the specification discussions utilizing terms such as "processing," "computing," "calculating," "determining", "analyzing" or the like, refer to the action and/or processes of a computer or computing system, or similar electronic computing device, that manipulate and/or transform data represented as physical, such as electronic, quantities into other data similarly represented as physical quantities.

In a similar manner, the term "processor" may refer to any device or portion of a device that processes electronic data, e.g., from registers and/or memory to transform that electronic data into other electronic data that, e.g., may be stored in registers and/or memory. A "computer" or a "computing machine" or a "computing platform" may include one or more processors.

The methodologies described herein are, in one embodiment, performable by one or more processors that accept computer-readable (also called machine-readable) code containing a set of instructions that when executed by one or more of the processors carry out at least one of the methods described herein. Any processor capable of executing a set of instructions (sequential or otherwise) that specify actions to be taken are included. Thus, one example is a typical processing system that includes one or more processors. Each processor may include one or more of a CPU, a graphics processing unit, and a programmable DSP unit. The processing system further may include a memory subsystem including main RAM and/or a static RAM, and/or ROM. A bus subsystem may be included for communicating between the components. The processing system further may be a distributed processing system with processors coupled by a network. If the processing system requires a display, such a display may be included, e.g., a liquid crystal display (LCD) or a cathode ray tube (CRT) display. If manual data entry is required, the processing system also includes an input device such as one or more of an alphanumeric input unit such as a keyboard, a pointing control device such as a mouse, and so forth. The term memory unit as used herein, if clear from the context and unless explicitly stated otherwise, also encompasses a storage system such as a disk drive unit. The processing system in some configurations may include a sound output device, and a network interface device. The memory subsystem thus includes a computer-readable carrier medium that carries computer-readable code (e.g., software) including a set of instructions to cause performing, when executed by one or more processors, one of more of the methods described herein. Note that when the method includes several elements, e.g., several steps, no ordering of such elements is implied, unless specifically stated. The software may reside in the hard disk, or may also reside, completely or at least partially, within the RAM and/or within the processor during execution thereof by the computer system. Thus, the memory and the processor also constitute computer-readable carrier medium carrying computer-readable code.

Furthermore, a computer-readable carrier medium may form, or be included in a computer program product.

In alternative embodiments, the one or more processors operate as a standalone device or may be connected, e.g., networked to other processor(s), in a networked deployment, the one or more processors may operate in the capacity of a server or a user machine in server-user network environment, or as a peer machine in a peer-to-peer or distributed network environment. The one or more processors may form a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine.

Note that while diagrams only show a single processor and a single memory that carries the computer-readable code, those in the art will understand that many of the components described above are included, but not explicitly shown or described in order not to obscure the inventive aspect. For example, while only a single machine is illustrated, the term "machine" shall also be taken to include any collection of machines that individually or jointly execute a set (or multiple sets) of instructions to perform any one or more of the methodologies discussed herein.

Thus, one embodiment of each of the methods described herein is in the form of a computer-readable carrier medium carrying a set of instructions, e.g., a computer program that is for execution on one or more processors, e.g., one or more processors that are part of web server arrangement. Thus, as will be appreciated by those skilled in the art, embodiments of the present invention may be embodied as a method, an apparatus such as a special purpose apparatus, an apparatus such as a data processing system, or a computer-readable carrier medium, e.g., a computer program product. The computer-readable carrier medium carries computer readable code including a set of instructions that when executed on one or more processors cause the processor or processors to implement a method. Accordingly, aspects of the present invention may take the form of a method, an entirely hardware embodiment, an entirely software embodiment or an embodiment combining software and hardware aspects. Furthermore, the present invention may take the form of carrier medium (e.g., a computer program product on a computer-readable storage medium) carrying computer-readable program code embodied in the medium.

The software may further be transmitted or received over a network via a network interface device. While the carrier medium is shown in an exemplary embodiment to be a single medium, the term "carrier medium" should be taken to include a single medium or multiple media (e.g., a centralized or distributed database, and/or associated caches and servers) that store the one or more sets of instructions. The term "carrier medium" shall also be taken to include any medium that is capable of storing, encoding or carrying a set of instructions for execution by one or more of the processors and that cause the one or more processors to perform any one or more of the methodologies of the present invention. A carrier medium may take many forms, including but not limited to, non-volatile media, volatile media, and transmission media. Non-volatile media includes, for example, optical, magnetic disks, and magneto-optical disks. Volatile media includes dynamic memory, such as main memory. Transmission media includes coaxial cables, copper wire and fiber optics, including the wires that comprise a bus subsystem. Transmission media also may also take the form of acoustic or light waves, such as those generated during radio wave and infrared data communications. For example, the term "carrier medium" shall accordingly be taken to included, but not be limited to, solid-state memories, a computer product embodied in optical and magnetic media; a medium bearing a propagated signal detectable by at least one processor of one or more processors and representing a set of instructions that, when executed, implement a method; and a transmission medium in a network bearing a propagated signal detectable by at least one processor of the one or more processors and representing the set of instructions.

It will be understood that the steps of methods discussed are performed in one embodiment by an appropriate processor (or processors) of a processing (i.e., computer) system executing instructions (computer-readable code) stored in storage. It will also be understood that the invention is not limited to any particular implementation or programming technique and that the invention may be implemented using any appropriate techniques for implementing the functionality described herein. The invention is not limited to any particular programming language or operating system.

It should be appreciated that in the above description of exemplary embodiments of the invention, various features of the invention are sometimes grouped together in a single embodiment, FIG., or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

In the description provided herein, numerous specific details are set forth. However, it is understood that embodiments of the invention may be practiced without these specific details. In other instances, well-known methods, structures and techniques have not been shown in detail in order not to obscure an understanding of this description.

Similarly, it is to be noticed that the term coupled, when used in the claims, should not be interpreted as being limited to direct connections only. The terms "coupled" and "connected," along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical or electrical contact, or that two or more elements are not in direct contact with each other but yet still co-operate or interact with each other.

Thus, while there has been described what are believed to be the preferred embodiments of the invention, those skilled in the art will recognize that other and further modifications may be made thereto without departing from the spirit of the invention, and it is intended to claim all such changes and modifications as falling within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

What is claimed is:

1. A computer implemented method for sharing content, the method comprising:
   displaying a touch/gesture driven user interface that is rendered on a display screen coupled to a first terminal, wherein the touch/gesture driven user interface includes:
      a map layer including image data representative of a facility, wherein the touch/gesture driven user interface is navigated by way of pan and zoom operations defined with respect to the map layer;
      one or more objects superimposed on the map layer, wherein each object is associated with a building resource defined in a building management system, each building resource being associated with name data;
   wherein the touch/gesture driven user interface is controllable by multiple modes, including at least one gesture-driven mode, and at least one voice-driven mode;
   wherein, for at least one voice-driven mode, a voice-command processing module is configured to have access to name data for the building resources, wherein the name data defines individual unique names for each of the building resources according to a location-specific hierarchy derived naming convention, wherein attributes of a given voice command are processed thereby to identify a particular one of the building resources; and
   wherein the voice-command processing module is context dependent, thereby to favor name data for resources shown on-screen over name data for resources not shown on screen at least when the given voice command does not inherently provide full location-specific hierarchy context.

2. A method according to claim 1 wherein panning and zooming operations with respect to the map layer are controllable using commands including the name data for the building resources.

3. A method according to claim 1 wherein the voice-command processing module is responsive to the given voice command by performing a command in respect of the identified building resource.

4. A method according to claim 1 wherein, in response to a predefined voice command indicative of name data for a given one of the building resources, the touch/gesture driven user interface is configured to navigate to a map layer position, in terms of pan and zoom, for displaying that given one of the building resources.

5. A method according to claim 1 wherein the at least one touch/gesture driven mode is controlled by at least one of: (i) a touch screen; or (ii) a motion sensing device.

6. A method according to claim 1 wherein the touch/gesture driven user interface is simultaneously controllable by the multiple modes, including at least one gesture-driven mode, and at least voice-driven mode.

7. A computer system configured to perform a method for sharing content, the computer system comprising:
   a controller comprising a processor;
   the controller comprising a voice-command processing module;
   a display screen operatively coupled to the controller;
   the controller configured to cause a touch/gesture driven user interface to be rendered on the display screen, wherein the touch/gesture driven user interface comprises:
      a map layer including image data representative of a facility, wherein the touch/gesture driven user interface is navigated by way of pan and zoom operations defined with respect to the map layer;
      one or more objects superimposed on the map layer, wherein each object is associated with a building resource defined in a building management system, each building resource being associated with name data;
   wherein the touch/gesture driven user interface is controllable by multiple modes, including at least one gesture-driven mode, and at least voice-driven mode;
   the voice-command processing module of the controller is configured to have access to name data for the building resources, wherein the name data defines individual unique names for each of the building resources according to a location-specific hierarchy derived naming convention, wherein attributes of a given voice command are processed by the voice-command processing module to identify a particular one of the building resources; and
   wherein the voice-command processing module of the controller is context dependent, thereby to favor name data for resources shown on-screen over name data for resources not shown on screen at least when the given voice command does not inherently provide full location-specific hierarchy context.

8. A system according to claim 7 wherein panning and zooming operations with respect to the map layer are controllable using commands including the name data for the building resources.

9. A system according to claim 7 wherein the voice-command processing module of the controller is responsive to the given voice command by performing a command in respect of the identified building resource.

10. A system according to claim 7 wherein, in response to a predefined voice command indicative of name data for a given one of the building resources, the touch/gesture driven user interface is configured to navigate to a map layer position, in terms of pan and zoom, for displaying that given one of the building resources.

11. A system according to claim 7 wherein the at least one touch/gesture driven mode is controlled by at least one of: (i) a touch screen; or (ii) a motion sensing device.

12. A system according to claim 7 wherein the touch/gesture driven user interface is simultaneously controllable by the multiple modes, including at least one gesture-driven mode, and at least voice-driven mode.

* * * * *